United States Patent [19]

Zimmerly

[11] Patent Number: 4,775,469
[45] Date of Patent: Oct. 4, 1988

[54] FILTER BAG SEALING DEVICE

[75] Inventor: Robert D. Zimmerly, Kenosha, Wis.

[73] Assignee: Tri-Clover, Inc., Kenosha, Wis.

[21] Appl. No.: 84,132

[22] Filed: Aug. 12, 1987

[51] Int. Cl.[4] ............................................. B01D 46/02
[52] U.S. Cl. .................................... 210/237; 55/373;
55/378; 55/493; 55/508
[58] Field of Search ............... 55/373, 493, 504, 508,
55/378; 210/237, 238

[56]      References Cited
       U.S. PATENT DOCUMENTS

| 3,387,433 | 6/1968  | Mackey        | 55/373 X |
| 3,672,130 | 6/1972  | Sullivan et al. | 55/504 X |
| 3,774,377 | 11/1973 | Bishop        | 55/493   |
| 3,774,769 | 11/1973 | Smith         | 55/373 X |
| 3,849,312 | 11/1974 | Wecker        | 210/337  |
| 3,928,008 | 12/1975 | Petersen      | 55/493 X |
| 4,002,443 | 1/1977  | Lorenz        | 55/504 X |
| 4,157,964 | 6/1979  | Rishel        | 55/373 X |
| 4,498,914 | 2/1985  | Ericksen      | 55/493 X |

Primary Examiner—Charles Hart
Attorney, Agent, or Firm—Fuller, Puerner & Hohenfeldt

[57]          ABSTRACT

A filter bag sealing device includes a sub-assembly that can be conveniently inserted into and removed from a filter housing. The sub-assembly comprises a filter basket, a filter bag, and an annular retainer. The three components are joined together by a locking mechanism that includes a pair of cams mounted to a shaft with stepped ends. The shaft extends between two lugs on the filter basket. A seal retained in the filter basket and a rigid ring in the mouth of the filter bag are placed between the filter basket and the retainer. Selectively rotating the cams draws the filter basket and retainer together to form the sub-assembly with a tight seal between the basket and retainer. The filter basket periphery includes a seal for sealing the sub-assembly to the inner diameter of the housing wall.

12 Claims, 2 Drawing Sheets

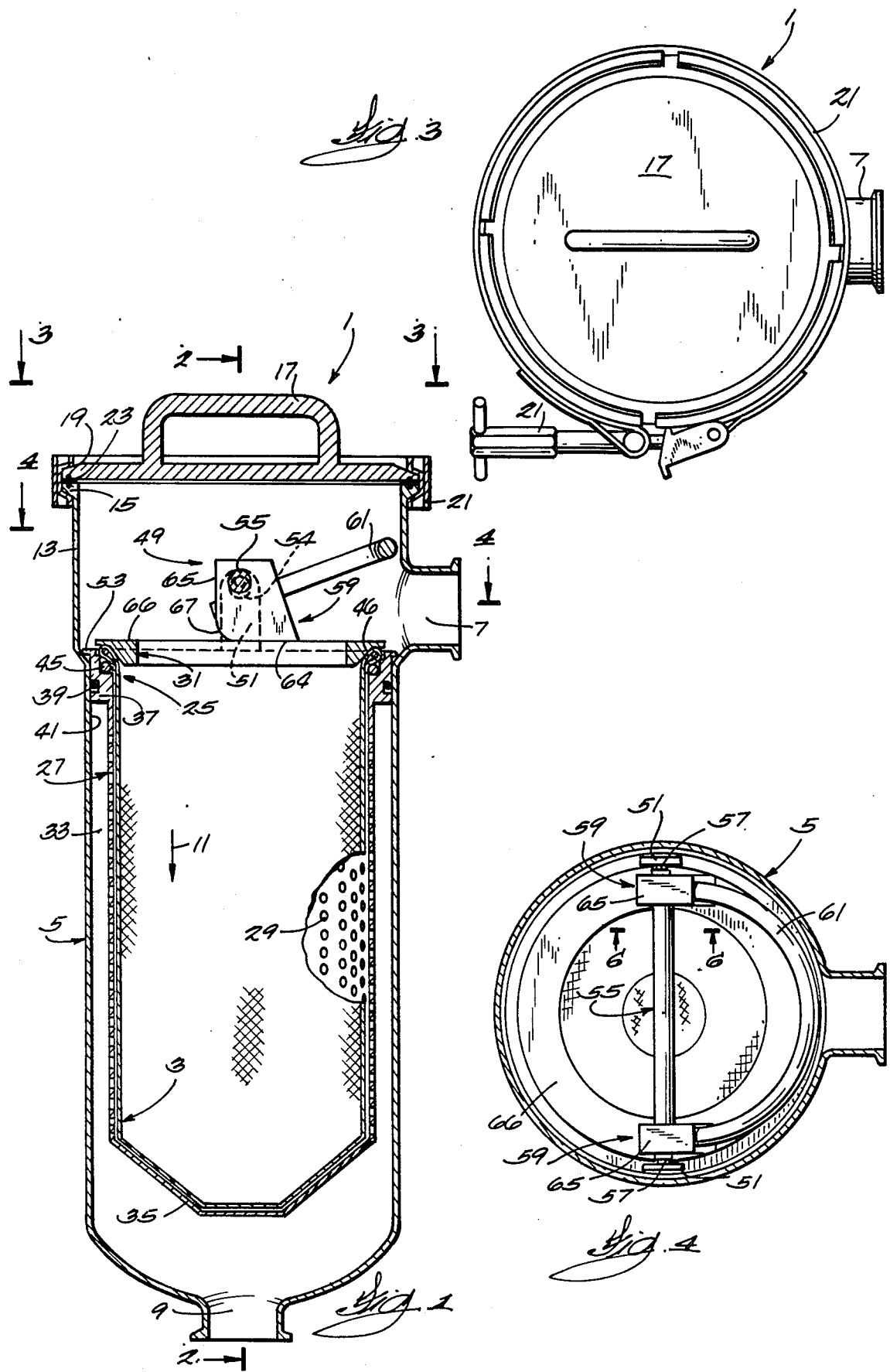

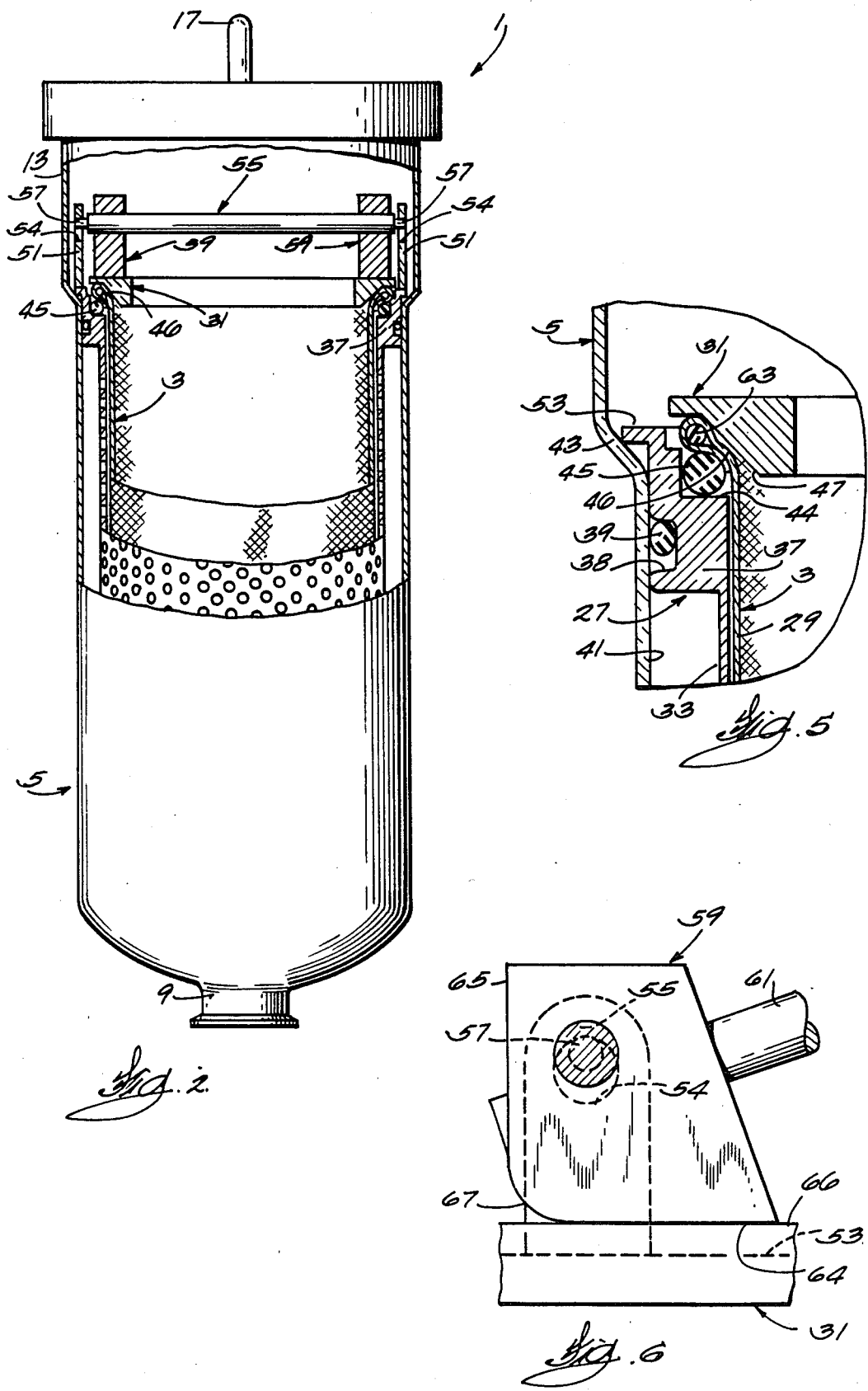

FILTER BAG SEALING DEVICE

BACKGROUND OF THE INVENTION

1. Field of the Invention

This invention pertains to filtration, and more particularly to replaceable filter assemblies.

2. Description of the Prior Art

Various equipment has been developed to filter fluids of different viscosities. A well-known type of filter is the bag filter, wherein the filter medium is generally in the form of a flexible bag suspended within a fluid-impervious housing. The filter bag may be of the self-supporting type, or it may be enclosed within a basket that provides mechanical strength against the pressure differential created by the fluid being forced through the bag.

Advantages of bag filters include their relatively low cost and their ability to handle large volumes of fluid. On the other hand, a reoccurring problem with bag type filters involves the mounting and retention of the filter medium within the housing. An essential criterion is that the fluid must not bypass the filter medium. Consequently, a highly effective seal is required between the filter medium and the housing interior. At the same time, the filter medium must be easily removable from the housing for servicing or replacement.

The opposed requirements of effective sealing and easy accessibility pose a design problem that has not been solved in a completely satisfactory manner. In a certain commercial product, the filter bag is sealed against both the housing and a housing cover. That design has the drawback of requiring the filter basket and filter bag to be installed and removed from the housing as individual pieces. In addition, the sealing areas between the filter bag, housing, and cover are hidden from view when assembled, thereby preventing inspection of the seal between the bag and housing.

Thus, a need exists for improved sealing in bag filters.

SUMMARY OF THE INVENTION

In accordance with the present invention, an inexpensive filter bag sealing device is provided that permits more reliable installation and easier servicing of the filter medium than was previously possible. This is accomplished by apparatus that includes a retainer that cooperates with a filter basket and filter medium to create a convenient sub-assembly.

The filter basket includes a generally annular ring sized to fit within the filter housing. The filter basket ring is formed to accept a pair of O-ring seals. The first O-ring creates a seal between the basket ring outer diameter and the filter housing inner diameter. The retainer is also annular shaped and has approximately the same inner and outer diameters as the filter basket ring. The second basket O-ring is installed between the basket ring and the retainer. The filter bag is held in place within the basket by means of a rigid ring sewn or otherwise joined to the bag mouth. The bag rigid ring is placed between the retainer and the basket second O-ring, with the bag rigid ring concentric with the basket second O-ring.

To assure a proper seal between the basket, bag rigid ring, and retainer, the present invention comprises a cam lock for compressing the basket second O-ring between the basket and the bag rigid ring. The cam lock includes two diametrically opposed lugs that are integral with and upstanding from the basket ring end face. Aligned holes in the lugs serve as journals for the stepped down ends of a shaft. The shaft ends are eccentrically mounted in the lug holes such that the shaft shoulders prevent the shaft from coming out of the lug holes unless the shaft is purposely aligned with lug holes. A pair of cams are freely rotatable on the shaft and are connected by a looped handle that may be curved to suit the inner diameter of the filter housing. The cams are designed such that as the handle is rotated in one direction they press the retainer toward the basket ring, thereby compressing the basket second O-ring. Rotating the handle in the opposite direction releases the retainer from the second O-ring and basket ring. The cams provide a smooth camming action and an over-center locked condition. With the cams in the locked condition, the retainer, basket, and filter bag form a sub-assembly that is easily assemblable outside the filter housing, thereby permitting visual inspection of the seal between the basket ring and the retainer. Further, the sub-assembly is readily insertable into the housing in a leak-proof manner to complete the filter assembly.

Other objects and advantages of the invention will become apparent to those skilled in the art upon reading the disclosure.

BRIEF DESCRIPTION OF THE DRAWINGS

FIG. 1 is a longitudinal cross-sectional view taken through a first diametral plane of the filter assembly of the present invention;

FIG. 2 is a cross-sectional view taken along lines 2—2 of FIG. 1;

FIG. 3 is a view taken along lines 3—3 of FIG. 1;

FIG. 4 is a cross-sectional view taken along lines 4—4 of FIG. 1;

FIG. 5 is an enlarged partial cross-sectional view of the sealing members of the present invention; and FIG. 6 is an enlarged cross-sectional view taken along lines 6—6 of FIG. 4.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring primarily to FIGS. 1–3, a filter assembly 1 is illustrated that includes the present invention. The filter assembly is particularly useful for filtering large volumes of fluid by means of a serviceable filter bag 3, but it will be understood that the invention is not limited to bag filter applications.

The filter assembly 1 comprises a hollow generally cylindrical housing 5 having an inlet port 7 and an outlet port 9 such that the fluid flows through the filter assembly in the direction of arrow 11. The housing wall 13 at the inlet end is formed with an out-turned flange 15. An end cap 17 has a similar flange 19. The end cap 17 is removably secured to the housing 5 by means of a conventional split ring clamp 21 acting on the flanges 15 and 19. A gasket 23 prevents leakage of the fluid between the housing and end cap.

In accordance with the present invention, the filter assembly 1 includes a filter medium sub-assembly 25. The sub-assembly 25 comprises a filter basket 27, the filter bag 3, and an annular retainer 31. The filter basket 27 is fabricated with a generally cylindrical perforated thin wall portion 33 having a first generally closed end 35. The second end of the filter basket is formed with an annular thick walled ring portion 37. As best shown in FIG. 5, the outer diameter of the basket ring portion 37 is machined with a groove 38 for accepting a first O-ring seal 39. The ring groove 38 and O-ring 39 are dimensioned such that the O-ring sealingly presses against the inner diameter 41 of the housing wall when the basket is inserted into the housing 5. To facilitate insertion of the basket O-ring 39 into sealing contact with the housing inner diameter 41, the housing wall is formed with a tapered transition wall portion 43. The filter basket ring portion 37 is further manufactured with a step 44 that accepts a second O-ring 45.

The filter bag 3 is composed of a generally flexible filter medium 29 and an annular rigid ring 63. The material of the filter medium 29 at the mouth of the bag is wrapped around the rigid ring 63 and sewn by known means to capture the rigid ring within the material, thereby giving shape to the bag mouth. The filter medium 29 of the filter bag 3 is inserted into the basket 27 such that the rigid ring 63 and the filter medium material 46 adjacent the rigid ring rest against the O-ring 45. The retainer 31 cooperates with the O-ring 45, the filter medium material 46, and rigid ring 63 to create a fluid tight seal between the basket 27 and the retainer. For that purpose, the retainers formed with a frusto-conical surface 47 that centers the retainer on the filter bag rigid ring and that bears against the rigid ring through the filter medium material 46.

To tightly press the retainer frusto-conical surface 47 against the rigid ring 63 and in turn the O-ring 45, the filter assembly 1 of the present invention includes a cam-lock mechanism 49. Turning to FIGS. 1, 2, 4, and 6, the cam lock mechanism 49 includes a pair of diametrically opposed lugs 51 that are upstandingly attached to the end face 53 of the filter basket ring portion 37. Mounted for rotation within aligned holes 54 in the lugs 51 is a shaft 55 with a concentric step 57 on each end. The steps 57 prevent the shaft 55 from accidently coming out of the lug holes 54. In turn, the shaft supports a pair of spaced cams 59 that freely rotate on the shaft. The shaft steps hold the whole assembly together yet allow it to be disassembled for cleaning without the use of tools by aligning the shaft with the lug holes and removing the shaft. A looped handle 61 has free ends that are secured to the case 59. With the cam lock in the position shown in the drawings, the cam surface 64 presses tightly against the retainer outer face 66. As a result, the retainer, filter, and basket are clamped together as a unit to form the sub-assembly 25.

The retainer 31, filter basket 27, and filter bag 3 can be assembled into the sub-assembly 25 outside of the filter housing 5. The entire sub-assembly is then inserted into the housing, and the O-ring 39 seals against the housing inner diameter 41. Consequently, the O-rings 39 and 45 create fluid-tight seals as the fluid flows through the housing. When installed inside the housing and cap 17, the cam lock mechanism 49 is safely protected from damage and accidental release. When the filter medium 29 requires servicing, the clamp 21 is loosened, and the cap 17 is removed from the housing 5. The sub-assembly 25 is pulled as a unit from the housing. The cam lock mechanism 49 is released by rotating the handle 61 approximately 90 degrees counterclockwise with respect to FIGS. 1 and 6. In the unlocked position, there is ample clearance between the cam side surfaces 65 and the retainer end face 66, so that the retainer can be removed from the sub-assembly and the filter bag 3 can be removed from the basket 27. To provide a smooth locking and unlocking action for the cams, the corners between their locking surfaces 64 and clearance surfaces 65 are formed with large radii 67.

The filter assembly 1 of the present invention lends itself to use with several types of filter media 29. In one version, the filter medium may be a flexible bag of paper or similar material mechanically supported by the perforated basket 27. In another version, the filter medium may be made from a relatively strong self-supporting metallic mesh.

Thus, without further description, it is thought that the advantages to be gained from the disclosed embodiment of the filter bag sealing device of the present invention will be apparent to those skilled in the art. Furthermore, it is contemplated that various modifications and alterations may be made to the present invention within the scope of the appended claims without departing from the spirit of the invention.

I claim:
1. A filter bag sealing device comprising:
   a. a filter basket comprising a generally cylindrical tubular portion and an annular ring portion secured to one end of the cylindrical tubular portion, the annular ring portion having an end face;
   b. a seal retained in the filter basket annular ring portion;
   c. a filter bag having a bag-shaped filter medium and a rigid ring secured to the mouth of the bag, the filter medium being inserted into the filter basket with the rigid ring lying against the seal and concentric therewith;
   d. an annular retainer bearing against the filter bag rigid ring; and
   e. lock means acting between the filter basket annular ring portion and the retainer for releasably joining the filter bag, filter basket, and retainer into a sub-assembly,

2. The filter bag sealing device of claim 1 wherein the lock means comprises:
   a. a pair of lugs upstandingly attached to the filter basket annular ring portion end face;
   b. a shaft mounted for rotation within the lugs;
   c. cam means mounted to the shaft for selectively bearing against and being spaced from the retainer; and
   d. a handle secured to the cam means, so that selectively rotating the handle actuates the cam means to bear against the retainer and join the filter bag, filter basket, and retainer into the sub-assembly.

3. The filter bag sealing device of claim 2 wherein the cam means comprises a pair of cams mounted to the shaft with one cam being located proximate each filter basket lug.

4. The filter bag sealing device of claim 3 wherein:
   a. the shaft is formed with a stepped down portion on each end; and
   b. the shaft stepped down ends are mounted eccentrically in the lugs.

5. A filter bag sealing device comprising:
   a. a hollow generally cylindrical housing having an open end;
   b. cap means for closing the housing open end;
   c. a filter basket having a generally cylindrical perforated first wall portion and a thick walled annular ring portion joined to one end of the first wall portion;

d. first seal means retained in the annular ring portion for sealing between the annular ring portion outer diameter and the inner diameter of the cylindrical housing, the annular ring portion having an end face;

e. a second seal retained in the filter basket annular ring portion end face;

f. a filter bag having a bag shaped filter medium and a rigid ring secured to the mouth of the bag, the filter medium being inserted into the filter basket with the rigid ring lying against and generally concentric with the second seal;

g. a retainer bearing against the filter bag rigid ring; and h. lock means acting between the filter basket annular ring portion and the retainer for releasably joining the filter bag, filter basket, and retainer into a sub-assembly that is selectively insertable and removable from the housing.

6. The filter bag sealing device of claim 5 wherein the lock means comprises:

a. a pair of lugs upstandingly attached to the filter basket annular ring portion end face;

b. a shaft mounted for rotation within the lugs;

c. cam means mounted to the shaft for selectively bearing against and being spaced from the retainer; and d. a handle secured to the cam means, so that selectively rotating the handle actuates the cam means to bear against the retainer and join the filter bag, filter basket, and retainer into the sub-assembly.

7. The filter bag sealing device of claim 6 wherein the cam means comprises a pair of cams mounted to the shaft with one cam being located proximate each filter basket lug.

8. The filter bag sealing device of claim 7 wherein:

a. the shaft is formed with a concentric step on each end; and b. the shaft is mounted to the lugs with the steps eccentric to the lugs.

9. A filter assembly comprising:

a. a thick walled annular ring having an end face;

b. a filter having a rigid ring;

c. a first seal interposed between the filter rigid ring and the thick wall annular ring, the thick walled annular ring, the filter rigid ring, and the first seal being generally concentric;

d. an annular retainer located concentric with and adjacent the filter rigid ring;

e. lock means acting between the thick wall annular ring and the retainer for joining the thick wall annular ring, filter, first seal, and retainer into a filter sub-assembly;

f. housing means for receiving the filter sub-assembly; and g. second seal means interposed between the housing means and the thick walled annular ring for creating a fluid-tight seal between the housing means and the sub-assembly.

10. The filter assembly of claim 9 wherein the lock means comprises:

a. a pair of lugs attached to the end face of the thick walled annular ring;

b. a shaft mounted for rotation between the lugs;

c. cam means mounted to the shaft for selectively bearing against and being spaced from the retainer; and d. a handle secured to the cam means, so that rotating the handle actuates the cam means to bear against the retainer and join the thick walled annular ring, filter, first seal, and retainer into the sub-assembly.

11. The filter assembly of claim 10 wherein the cam means comprises a pair of cams mounted to the shaft with one cam being located proximate each thick walled annular ring lug.

12. The filter assembly of claim 11 wherein:

a. the lugs have respective holes aligned along a first axis;

b. the shaft is formed with a stepped down portion on each end that is concentric with the shaft axis; and c. the shaft stepped down portions are mounted in the lug holes with the shaft axis eccentric to the lugs first axis, so that the shaft steps hold the filter assembly together and allows disassembly without tools.

* * * * *